United States Patent
Arimilli et al.

(12)

(10) Patent No.: US 6,687,795 B2
(45) Date of Patent: Feb. 3, 2004

(54) DATA PROCESSING SYSTEM AND METHOD OF COMMUNICATION THAT REDUCE LATENCY OF WRITE TRANSACTIONS SUBJECT TO RETRY

(75) Inventors: Ravi Kumar Arimilli, Austin, TX (US); George W. Daly, Jr., Austin, TX (US); Paul Umbarger, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 589 days.

(21) Appl. No.: 09/742,763

(22) Filed: Dec. 20, 2000

(65) Prior Publication Data

US 2002/0124145 A1 Sep. 5, 2002

(51) Int. Cl.$^7$ .................................................. G06F 12/00
(52) U.S. Cl. ....................... 711/146; 711/124; 711/120
(58) Field of Search .............................. 711/146, 124, 711/120

(56) References Cited

U.S. PATENT DOCUMENTS 5,506,971 A * 4/1996 Gullette et al. ............. 710/116

OTHER PUBLICATIONS

Preiss et al. "A Cache–based Message Passing Scheme for a Shared–bus Multiprocessor", 1988 International Conference on Computer Architecture p. 358–364.*

* cited by examiner

Primary Examiner—Manlo Padmanabhan
Assistant Examiner—Paul A Baker
(74) Attorney, Agent, or Firm—Casimer K. Salys; Bracewell & Patterson, L.L.P.

(57) ABSTRACT

A data processing system includes a plurality of snoopers coupled to an interconnect. In response to a memory access request transmitted on an interconnect by one of the snoopers receiving a Retry response, a determination is made whether or not the Retry response was caused by a target snooper that will service the memory access request. If not, the target snooper services the memory access request in spite of the Retry response. In a preferred embodiment in which the memory access request is a write request and the target snooper is a memory controller, stale data cached by at least one snooper in association with the address are also invalidated by a snooper, such as the memory controller, transmitting at least one address-only kill transaction on the interconnect. Advantageously, the address-only kill transaction can be issued concurrently with or following servicing the write request so that the write request does not incur latency by waiting until all stale copies of the data have been invalidated.

24 Claims, 4 Drawing Sheets

DATA PROCESSING SYSTEM AND METHOD OF COMMUNICATION THAT REDUCE LATENCY OF WRITE TRANSACTIONS SUBJECT TO RETRY

BACKGROUND OF THE INVENTION

1. Technical Field

The present invention relates in general to data processing and, in particular, to memory access in a data processing system. Still more particularly, the present invention relates to a data processing system and method of communication that reduce latency of write transactions subject to retry.

2. Description of the Related Art

A generalized data processing system architecture includes a system memory, a plurality of snoopers, and an interconnect coupling the plurality of snoopers to the system memory to permit read and write access. In many data processing system implementations, at least one of the snoopers, for example, a processor, has one or more associated caches for storing data and/or instructions (hereinafter, both referred to as data) at relatively low access latency as compared to the system memory. For example, access by a processor to an associated cache may take on the order of ones or tens of processor cycles, while access to the system memory via the interconnect may require hundreds of processor cycles.

In data processing system implementations in which snoopers cache data, it is essential for proper operation that a single view of the contents of memory is provided to all of the snoopers, that is, that a coherent memory hierarchy be maintained. A coherent memory hierarchy is maintained through the implementation of a cache coherency protocol that specifies the caching behavior implemented by the snoopers and a communication protocol that specifies the snoop responses snoopers are required to provide to memory access requests snooped on the interconnect.

According to a typical communication protocol, each snooper provides a snoop response to each memory access request snooped on the interconnect. For example, if a snooper receives a request for cached data, the snooper provides a Shared snoop response if the data are cached non-exclusively and are coherent with corresponding data in the system memory. Similarly, the snooper provides a Modified snoop response if the snooper's cache holds a copy of the requested data that is modified with respect to corresponding data in the system memory. After all of the snoopers have provided a snoop response, the coherency responses of the snoopers are compiled to create a so-called "combined response" that determines the manner in which the memory access request will be serviced by the data processing system.

Occasionally, a snooper may not be able to process a snooped memory access request in a timely manner. For example, the snooper may lack sufficient resources (e.g., queues) to check the cache directory for the address specified by the memory access request. In such cases, the snooper provides a Retry snoop response to indicate the inability to process the transaction. If any of the snoopers provides a Retry snoop response to a snooped memory access request, the combined response for the request is generally also Retry, meaning that the transaction cannot be completed at the current time. Thus, to obtain service for the memory access request, the requesting snooper must again transmit the memory access request on the interconnect, in hopes that the condition causing the Retry has been resolved (e.g., a queue has become available). In general, the requesting snooper continues retrying the request until the request is ultimately serviced.

In data processing systems having a small number of snoopers, the request/Retry methodology outlined above works reasonably well in that the probability that any particular transaction will receive a Retry combined response is relatively low. However, as the number of snoopers scales (e.g., in large symmetric multiprocessor (SMP) systems), the probability that a request will receive a Retry combined response concomitantly increases. Thus, in large-scale cache coherent data processing systems, memory access requests may be subject to unacceptably large latency, thereby diminishing overall system performance.

SUMMARY OF THE INVENTION

The present invention appreciates that in the conventional request/Retry scenario described above, the delay (or latency) in servicing a memory access request can advantageously be reduced by modification of the behavior of snoopers in the event a Retry combined response.

In accordance with the present invention, a data processing system includes a plurality of snoopers coupled to an interconnect. In response to a memory access request transmitted on an interconnect by one of the snoopers receiving a Retry response, a determination is made whether or not the Retry response was caused by a target snooper that will service the memory access request. If not, the target snooper services the memory access request in spite of the Retry response. In a preferred embodiment in which the memory access request is a write request and the target snooper is a memory controller, stale data cached by at least one snooper in association with the address are also invalidated by a snooper, such as the memory controller, transmitting at least one address-only kill transaction on the interconnect. Advantageously, the address-only kill transaction can be issued concurrently with or following servicing the write request so that the write request does not incur latency by waiting until all stale copies of the data have been invalidated.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
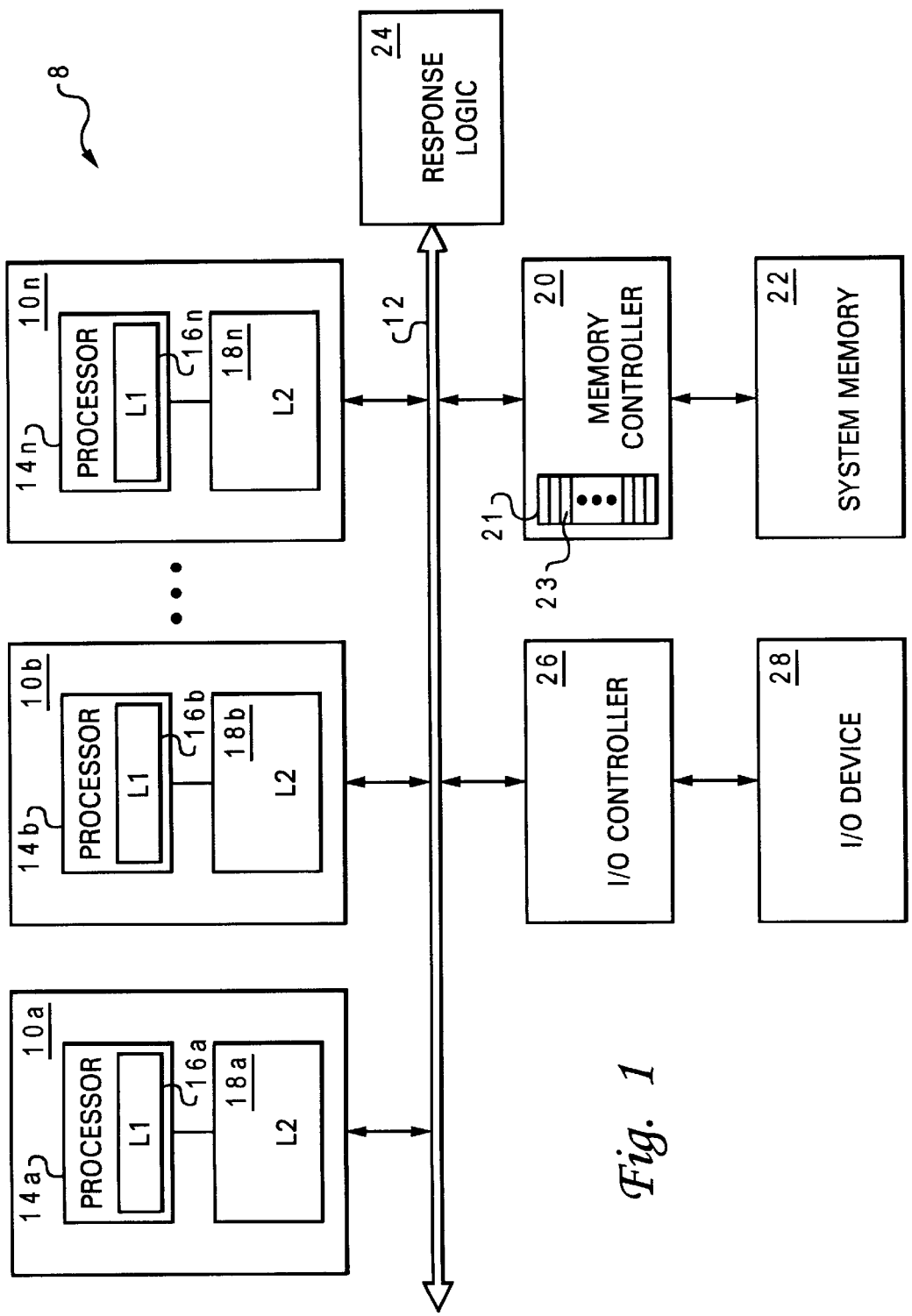
FIG. 1 depicts an illustrative embodiment of a data processing system with which the method and system of the present invention may advantageously be utilized.

With reference now to the figures and in particular with reference to FIG. 1, there is illustrated a high-level block diagram of a symmetric multiprocessor (SMP) data processing system in accordance with the present invention. As depicted, data processing system 8 includes a number of processing units 10a–10n (e.g., n=64) coupled to a system interconnect 12. Each processing unit 10 is an integrated circuit including one or more processors 14. In addition to the registers, instruction flow logic and execution units utilized to execute program instructions, each of processors 14 also includes an associated level one (L1) cache 16, which temporarily stores data that are likely to be accessed by the associated processor 14. Although L1 caches 16 are illustrated in FIG. 1 as unified caches, those skilled in the art will appreciate that each of L1 caches 16 could alternatively be implemented as bifurcated instruction and data caches.

As further illustrated in FIG. 1, the memory hierarchy of data processing system 8 also includes one or more system memories 22, which form the lowest level of volatile data storage in the memory hierarchy, and one or more lower levels of cache memory, such as on-chip level two (L2) caches 18, which are utilized to stage data from system memory 22 to processors 14. As understood by those skilled in the art, each succeeding lower level of the memory hierarchy is typically capable of storing a larger amount of data than higher levels, but at higher access latency. For example, in an exemplary embodiment, L1 caches 16 may each have 512 64-byte cache lines for a total storage capacity of 32 kilobytes (kB), all at single cycle latency. L2 caches 18 may each have 2048 128-byte cache lines for a total storage capacity of 256 kB at approximately 10-cycle latency. Finally, each system memory 22 can store hundreds of megabytes or gigabytes of data at an even longer latency, for example, 300–400 cycles.

Data processing system 8 further includes a memory controller 20 that interfaces system memory 22 to interconnect 12. Memory controller 20 includes one or more queues 21 having one or more individual queue entries 23. Queue entries 23 are utilized by memory controller 20 to buffer transactions (e.g., read, write, etc.) snooped on interconnect 12 until processing of the transactions is completed. As shown, data processing system 8 may also include other snoopers, such as I/O controller 26, which interfaces one or more I/O devices 28 to interconnect 12.

System interconnect 12, which can comprise one or more buses or a switch fabric, serves as a conduit for communication among the snoopers (e.g., processing units 10, memory controller 20 and I/O controller 26) coupled to system interconnect 12. A typical transaction on system interconnect 12 begins with a request, which may include a transaction field indicating the type of transaction, source and destination tags indicating the source and intended recipient(s) of the transaction, respectively, and an address and/or data. Each device connected to system interconnect 12 preferably snoops all transactions on system interconnect 12 and, if appropriate, responds to the request with a snoop response. As discussed further below, such snoop responses are received and compiled by response logic 24, which provides a combined response indicating what action, if any, each snooper is to take in response to the request. These actions may include sourcing data on system interconnect 12, storing data provided by the requesting snooper, invalidating cached data, etc. Although illustrated separately, it should be understood that response logic 24 may alternatively be incorporated within a particular snooper (e.g., memory controller 22) or be distributed among the various snoopers such that different snoopers (e.g., the requesting snooper) compile the snoop responses to produce the combined response.

Those skilled in the art will appreciate that data processing system 8 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of any architecture and are in no way limited to the generalized SMP architecture illustrated in FIG. 1.

Figure 2:
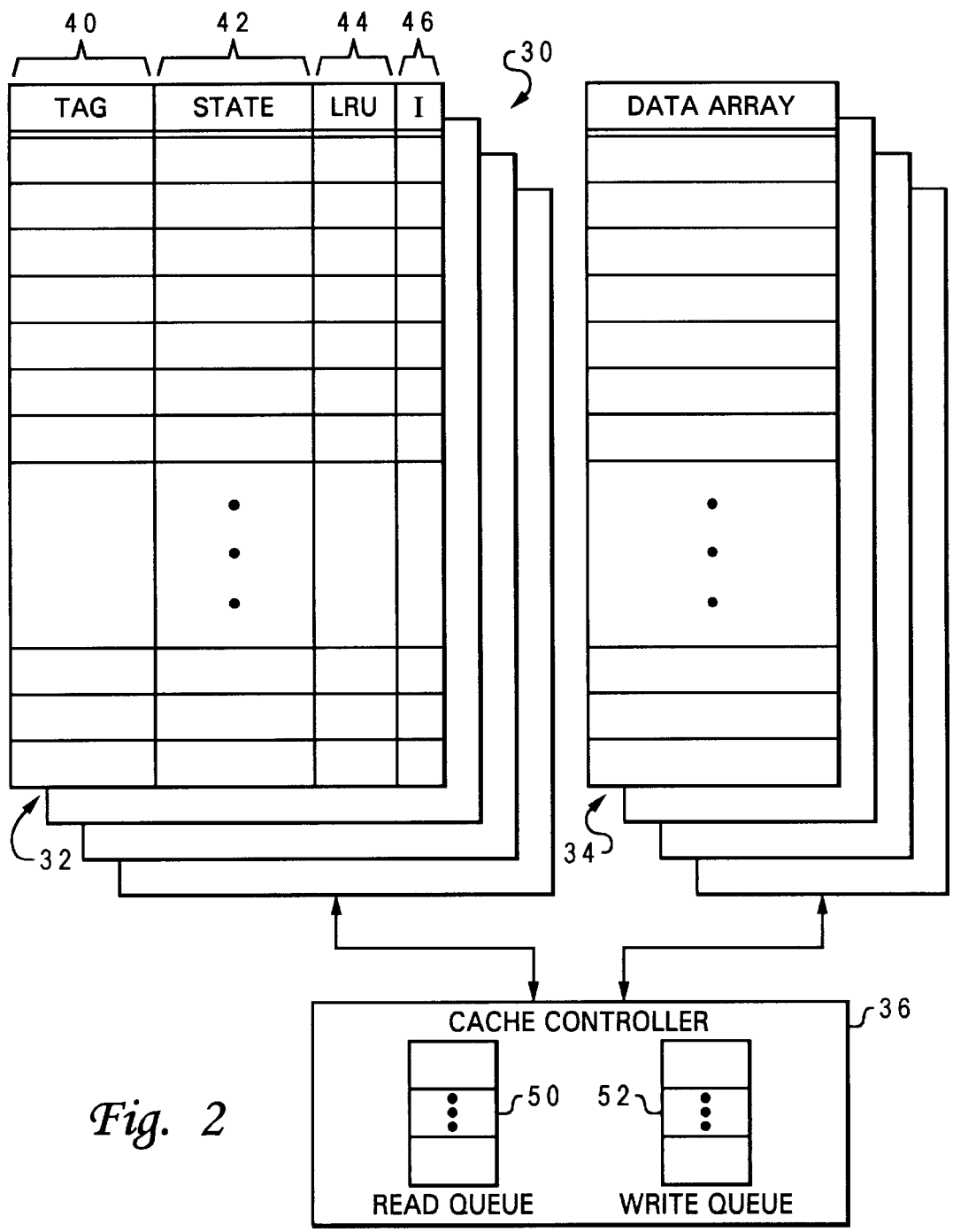
FIG. 2 illustrates a cache in accordance with an illustrative embodiment of the present invention.

With reference now to FIG. 2, there is depicted a more detailed block diagram of an illustrative embodiment of a cache 30 that may be utilized to implement any of L1 caches 16 or L2 caches 18 in accordance with the present invention. In the illustrative embodiment, cache 30 is a four-way set associative cache including a directory 32, a data array 34, and a cache controller 36. Accordingly, data array 34 of cache 30 comprises a number of congruence classes that each contain four ways for storing cache lines. As in conventional set associative caches, memory locations in system memories 22 are mapped to particular congruence classes within data array 34 utilizing predetermined index bits within the system memory address.

The cache lines stored within data array 34 are recorded in cache directory 32, which contains one directory entry for each way in data array 34. Each directory entry comprises a tag field 40, a state field 42, a least recently used (LRU) field 44, and an inclusion field 46. Tag field 40 specifies which cache line is stored in the corresponding way of data array 34 by storing the tag bits of the system memory address of the cache line. State field 42 indicates the coherency state of the cache line stored in the corresponding way of data array 34 utilizing predefined bit combinations. LRU field 44 indicates how recently the corresponding way of data array 34 has been accessed relative to the other ways of its congruence class, thereby indicating which cache line should be evicted from the congruence class in case of a cache miss. Finally, inclusion field 46 indicates whether or not the cache line stored in the corresponding way of data array 34 is also stored in the next lowest level of the memory hierarchy.

Still referring to FIG. 2, cache controller 36 manages storage and retrieval of data within data array 34 and updates to cache directory 32 in response to signals received from the associated components of the memory hierarchy and transactions snooped on system interconnect 12. As illustrated, cache controller 36 maintains a read queue 50 and a write queue 52 from which cache controller 36 performs updates to cache directory 32 and accesses to data array 34.

Figure 3:
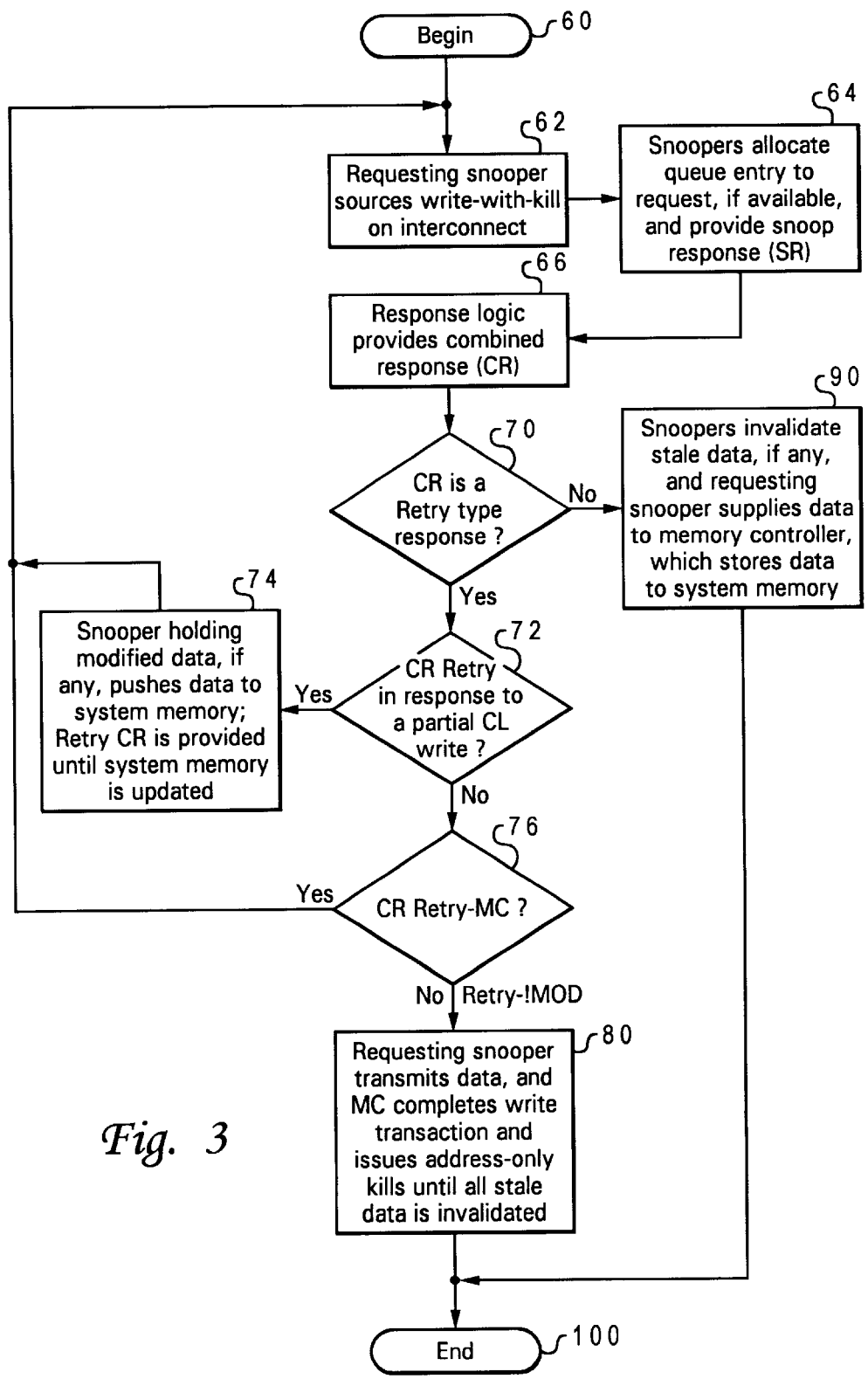
FIG. 3 is a high level logical flowchart of a method of performing a write-with-kill transaction in accordance with a preferred embodiment of the present invention.

With reference now to FIG. 3, there is illustrated a high level logical flowchart of a method of servicing memory access requests and, in particular write-with-kill requests, in a data processing system such as data processing system 8 of FIG. 1 in accordance with the present invention. To further illustrate aspects of the present invention, reference will also be made to the interconnect timing diagram depicted in FIG. 4. It should be noted that FIG. 4 only depicts the interconnect tenures necessary for an understanding of the present invention and that other tenures, which are interleaved with those illustrated, are omitted for clarity.

As shown, the method begins at block 60 of FIG. 1 and then proceeds to block 62, which illustrates a requesting snooper (which hereafter will be assumed to be I/O controller 26) issuing a write-with-kill request on system interconnect 12. In a preferred embodiment of the present invention, the communication protocol of system interconnect 12 defines two types of write-with-kill requests: (1) partial cache line (PCL) write-with-kill, which specifies a target address aligned with a boundary other than the cache line boundary (e.g., an 8-byte boundary rather than an 128-byte boundary) and (2) full cache line (FCL) write-with-kill, which specifies a target address aligned with a cache line boundary. The type of write-with-kill request is preferably specified by a transaction-type field transmitted in conjunction with the target address. PCL write-with-kill requests and FCL write-with-kill requests are depicted in FIG. 4 at blocks 110–114 and blocks 116, 118, respectively.

Following block 62 of FIG. 3, the process proceeds to block 64, which depicts the other snoopers allocating a queue entry to the write-with-kill request, if one is available. In addition, each of the other snoopers provides a snoop response to the write-with-kill request, which for processing units 10 indicates the coherency state of the data referenced by the write address in the associated L2 cache 18. Exemplary snoop responses include those summarized below in Table I.

Figure 4:
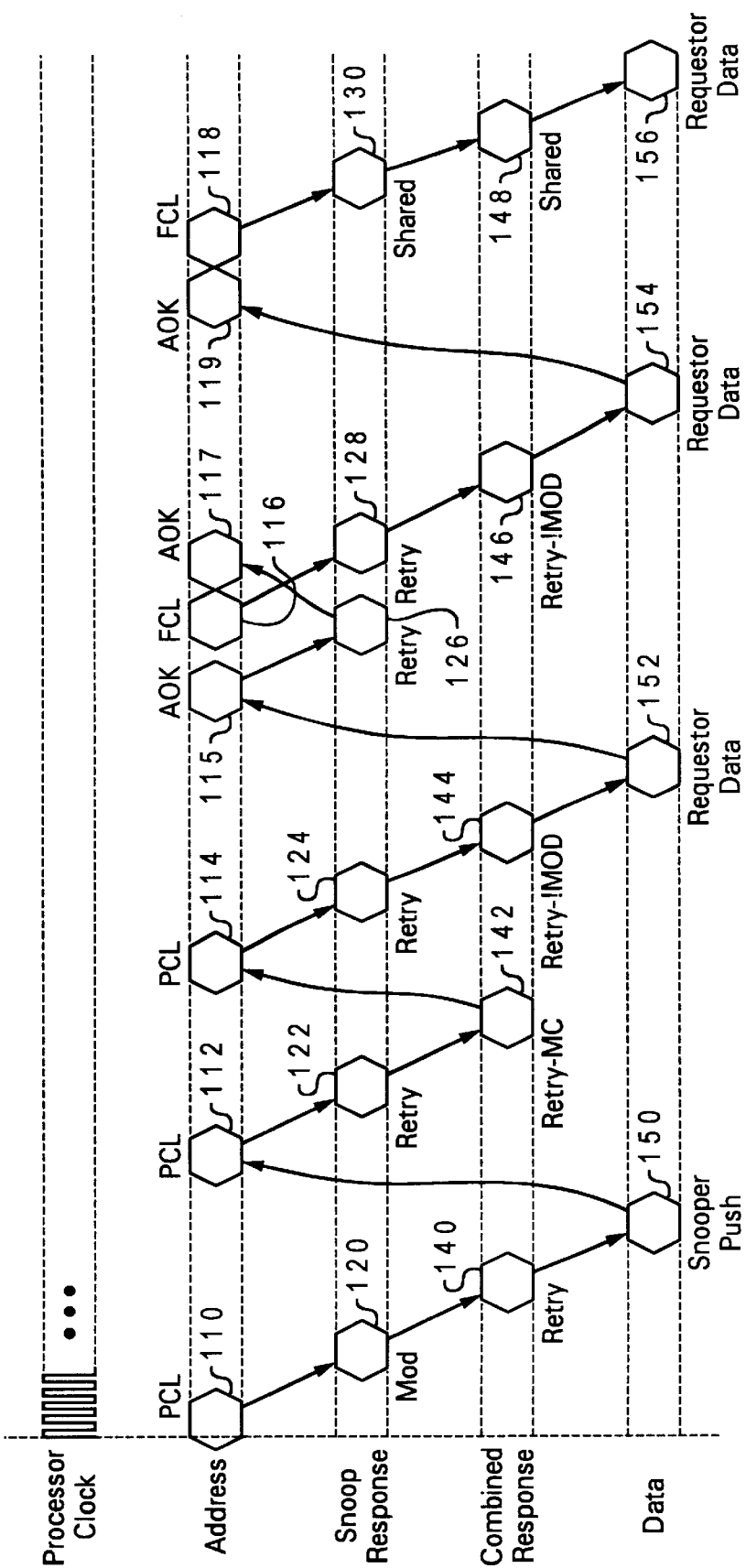
FIG. 4 is a timing diagram depicting a write-with-kill in accordance with the method illustrated in FIG. 3.

Snoop responses are depicted at reference numerals 120–130 of FIG. 4.

TABLE I

| Snoop response | Description |
| --- | --- |
| Null | Snooper does not cache a valid copy of the data |
| Shared | Snooper caches a valid copy of the data that is consistent with system memory |
| Modified | Snooper caches a valid copy of the data that is not consistent with system memory |
| Retry | Snooper cannot accept transaction now and may cache modified data |
| Retry-!MOD | Snooper cannot accept transaction now and does not cache modified data |

As illustrated at block 66 of FIG. 3, response logic 24 receives the snoop responses from the snoopers via system interconnect 12 and compiles the snoop responses to produce a combined response, which response logic provides to all of the snoopers via system interconnect 12. As noted above, the combined response provides the snoopers coherency information so that the snoopers know how to respond to service the request. Exemplary combined responses defined by a preferred embodiment of the communication protocol of system interconnect 12 are summarized below in Table II. Various combined responses are depicted at reference numerals 140–148 of FIG. 4.

TABLE II

| Combined response | Description |
| --- | --- |
| Null | No snooper caches a valid copy of the data |
| Shared | At least one snooper caches a valid copy of the data that is consistent with system memory |
| Modified | At least one snooper caches a modified copy of the data that is not consistent with system memory |

TABLE II-continued

| Combined response | Description |
| --- | --- |
| Retry | At least one snooper cannot accept transaction and the reason may be because modified data must first be stored to system memory |
| Retry-!MOD | At least one snooper cannot accept write transaction, but does not cache modified data |
| Retry-MC | Memory controller cannot accept a write transaction |

As represented at block 70 of FIG. 3, if the combined response is not one of the three varieties of Retry combined responses listed in Table II, the process proceeds to block 90, which is described below. However, if the combined response is a Retry combined response, and, in particular, is a "plain" Retry combined response to a PCL write-with-kill request as shown at reference numeral 140 in FIG. 4, the PCL write-with-kill cannot be completed until system memory 22 is updated with modified data, if any, cached by the snooper(s) providing the snoop response that caused the Retry combined response. Accordingly, the process shown in FIG. 3 proceeds from block 70 through block 72 to block 74, which illustrates the snooper, if any, holding modified data associated with the write address pushing the modified data to system memory 22 via system interconnect 12, as shown at reference numeral 150 of FIG. 4. In addition, in the event that the requesting snooper reissues the PCL write-with-kill transaction prior to the modified data being written into system memory 22, the snooper pushing the modified data to system memory 22 continues to provide a Retry snoop response, and response logic 24 continues to provide a Retry combined response so that the PCL write-with-kill is not performed until the modified data are stored to system memory 22.

Following block 74, the process returns to block 62, which depicts I/O controller 26 reissuing the PCL write-with-kill request on system interconnect 12. If memory controller 20 is unable to accept the request, for example, because memory controller 20 does not have an available queue entry 23 in queue 21, memory controller 22 provides a Retry (or Retry-MC) snoop response, as shown at block 64 of FIG. 3 and at reference numeral 122 of FIG. 4. After compiling the snoop responses, response logic 24 generates a Retry-MC combined response 142 to indicate to I/O controller 26 and the other snoopers that memory controller 22, which is the target of the write-with-kill request, is unable to service the request. As shown in FIG. 3, if the combined response to a write-with-kill is a Retry-MC, the process returns to block 62, which illustrates I/O controller 26 again reissuing the PCL write-with-kill request, as shown at reference numeral 114 of FIG. 4.

Assuming the reissued PCL write-with-kill request receives at least one Retry-!MOD snoop response 122 (e.g., because a snooper other than memory controller 20 has resources to check directory 30 to ascertain that the data are not cached in a modified state, but does not have an available queue entry to allocate to the request) and a Retry-!MOD combined response 142 (i.e., not a Retry or Retry-MC combined response), the process shown in FIG. 3 proceeds through blocks 70–76 to block 80. As shown in block 80 of FIG. 3 and at reference numeral 152 of FIG. 4, I/O controller 26 responds to the Retry-!MOD combined response by transmitting the write data on system interconnect 12.

Memory controller 20 receives the write data from system interconnect 12 and services the PCL write-with-kill request by storing the write data to system memory 22, despite the presence of a Retry type of combined response. Importantly, memory controller 20 10 can complete the write operation without the PCL write-with-kill request being reissued because the memory controller "knows" that any stale data associated with the write address will subsequently be invalidated and any read, read-with-intent-to-modify, dclaim, or other requests for the data will receive a high priority Retry type of snoop response until the stale data is invalidated. In a preferred embodiment of the present invention, memory controller 20 (i.e., the target snooper) is made responsible for invalidating the stale data and Retrying read requests for the stale data. In an alternative embodiment, the requesting snooper can be responsible for invalidating the stale data and Retrying read requests for stale data.

As shown in FIG. 4, memory controller 20 invalidates stale data, if any, by sourcing address-only kill (AOK) transactions, such as AOK transaction 115, on system interconnect 12. If any snooper responds with a Retry snoop response 126 to the AOK transaction, memory controller 20 continues to issue AOK transactions, such as AOK transaction 117, until all snoopers invalidate their stale data associated with the write address. The timing of the AOK transactions is independent of any succeeding write requests by I/O controller 26, as demonstrated by AOK transaction 117 following FCL write-with-kill request 116.

Referring again to block 66 of FIG. 3, if the combined response provided by response logic 24 is other than one of the three types of Retry responses (e.g., a Shared combined response as shown at reference numeral 148 of FIG. 4), then the process proceeds through block 70 to block 90. Block 90 illustrates the snoopers, if any, which cache data associated with the write address invalidating the stale data. In addition, as shown at reference numeral 156 of FIG. 4, I/O controller 26 transmits the write data to memory controller 20, which stores the write data into system memory 22. Thereafter, the process depicted in FIG. 3 terminates at block 100.

As has been described, the present invention provides an improved data processing system and method that reduce the latency associated with memory access requests receiving a Retry response. In particular, the present invention permits a target snooper, such as a memory controller, to service a write request in the presence of a Retry response, if the Retry response was not caused by the target snooper. As a result, the number of times that a request must be reissued prior to receiving service is advantageously minimized, and the resources of the requesting snooper can be allocated to other requests.

While the invention has been particularly shown and described with reference to a preferred embodiment, it will be understood by those skilled in the art that various changes in form and detail may be made therein without departing from the spirit and scope of the invention.

What is claimed is:

1. A method of operating a data processing system, said method comprising:
    transmitting a memory access request on an interconnect;
    snooping said memory access request at a plurality of snoopers including a target snooper;
    if the memory access request receives a Retry response caused by the target snooper, reissuing the memory access request; and
    if the memory access request receives a Retry response caused by a snooper among said plurality of snoopers other than the target snooper, servicing the memory access request by the target snooper without reissuing the memory access request.

2. The method of claim 1, wherein transmitting a memory access request comprises transmitting a write request.

3. The method of claim 2, wherein the target snooper is a memory controller for a system memory, said method further comprising allocating a queue entry to said write request in said memory controller and maintaining said allocation following the Retry response.

4. The method of claim 3, said write request comprising a write with kill request having an associated address and data, wherein:
    servicing the write request comprises said memory controller writing the data into the system memory; and
    said method further comprises invalidating stale data cached in association with said address by at least one of said plurality of snoopers.

5. The method of claim 4, wherein invalidating stale data comprises a snooper among said plurality of snoopers transmitting at least one address-only kill transaction on the interconnect.

6. The method of claim 5, wherein transmitting at least one address-only kill transaction comprises transmitting said at least one address-only kill no earlier than said servicing of said write request.

7. The method of claim 1, wherein the Retry response is a Retry combined response, said method further comprising providing a snoop response by each of the plurality of snoopers and combining the snoop responses of all of the plurality of snoopers to obtain the Retry combined response.

8. The method of claim 1, wherein the memory access request is a partial cache line write request having an associated address, said method further comprising:
    if the Retry response was caused by a snooper that caches modified data associated with the write address, performing the step of servicing the memory access request only after the modified data is written to system memory.

9. A data processing system, comprising:
    an interconnect; and
    a plurality of snoopers coupled to the interconnect, said plurality of snoopers including a target snooper and a requesting snooper that transmits a memory access request on the interconnect, wherein the requesting snooper reissues the memory access request if the memory access request receives a Retry response caused by the target snooper, and wherein the target snooper servicing the memory access request without the memory access request being reissued if the memory access request receives a Retry response caused by a snooper among said plurality of snoopers other than the target snooper.

10. The data processing system of claim 9, wherein the memory access request comprises a write request.

11. The data processing system of claim 10, wherein:
    the target snooper comprises a memory controller; and
    the data processing system further comprises a system memory coupled to the memory controller, said memory controller including a queue from which a queue entry is allocated to said write request and remains allocated following the Retry response.

12. The data processing system of claim 11, wherein:
    said write request comprises a write with kill request having an associated address and data;
    the memory controller comprises means for writing the data into the system memory to service the write with kill request; and the data processing system comprises means for invalidating stale data cached in association with said address by at least one of said plurality of snoopers.

13. The data processing system of claim 12, wherein the means for invalidating stale data comprises a snooper among said plurality of snoopers that transmits at least one address-only kill transaction on the interconnect.

14. The data processing system of claim 12, wherein the means for invalidating comprises a snooper that transmits at least one address-only kill transaction on the interconnect no earlier than servicing of said write request.

15. The data processing system of claim 9, wherein the Retry response is a Retry combined response, said data processing system further comprising response logic that compiles snoop responses of the plurality of snoopers to generate the Retry combined response.

16. The data processing system of claim 9, wherein the memory access request is a partial cache line write request having an associated address, wherein if the Retry response was caused by a snooper that caches modified data associated with the address, the target snooper services the memory access request only after the cached data is written to system memory.

17. A snooper for a data processing system including a plurality of snoopers coupled to an interconnect, said snooper comprising:

means for snooping a memory access request on the interconnect and for providing a response thereto; and means for, if the memory access request receives a Retry response caused by another snooper, servicing the memory access request without the memory access request being reissued.

18. The snooper of claim 17, wherein the snooper comprises a memory controller for a system memory, said memory controller further comprising a queue in which an entry is allocated to said write request, said memory controller maintaining said allocation following the Retry response.

19. The snooper of claim 18, said write request comprising a write with kill request having an associated address and data, wherein:

said means for servicing the write request comprises means for writing the data into the system memory; and said memory controller further comprises means for invalidating stale data cached in association with said address by at least one of the plurality of snoopers.

20. The method of claim 19, wherein the means for invalidating stale data comprises means for transmitting at least one address-only kill transaction on the interconnect.

21. The method of claim 20, wherein the means for transmitting at least one address-only kill transaction comprises means for transmitting said at least one address-only kill no earlier than said servicing of said write request.

22. The snooper of claim 17, wherein the Retry response comprises a Retry combined response.

23. The snooper of claim 17, wherein the memory access request is a partial cache line write request having an associated address, said snooper further comprising:

means for, if the Retry response was caused by a snooper that caches modified data associated with the write address, servicing the memory access request only after the modified data is written to system memory.

24. The snooper of claim 17, wherein the snooper comprises a memory controller.

* * * * *